Sept. 25, 1923.

H. FABER

SPRING COMPRESSOR

Filed Nov. 7, 1921

1,469,076

Inventor
H. Faber.
By Geo. F. Kimmel
Attorney

Patented Sept. 25, 1923.

1,469,076

UNITED STATES PATENT OFFICE.

HAROLD FABER, OF MOUNT PLEASANT, MICHIGAN.

SPRING COMPRESSOR.

Application filed November 7, 1921. Serial No. 513,308.

*To all whom it may concern:*

Be it known that I, HAROLD FABER, a citizen of the United States, residing at Mount Pleasant, in the county of Isabella and State of Michigan, have invented certain new and useful Improvements in Spring Compressors, of which the following is a specification.

This invention relates to spring compressors and more particularly to devices of this character for compressing and holding spiral springs to adapt them to be replaced or removed if desired.

The object of the invention is to provide a spring compressor of this character which while of minimum simplicity is powerful for compressing stiff spiral springs and may be easily applied and operated by hand.

With these and other objects in view, the invention consists in certain novel features of construction as hereinafter shown, described and claimed.

In the accompanying drawings:—

The compressor constituting this invention is especially designed for use in connection with automobile engines, but obviously it is capable of use in any case where a spring is to be compressed and maintained in a compressed condition for any reason.

Figure 1:
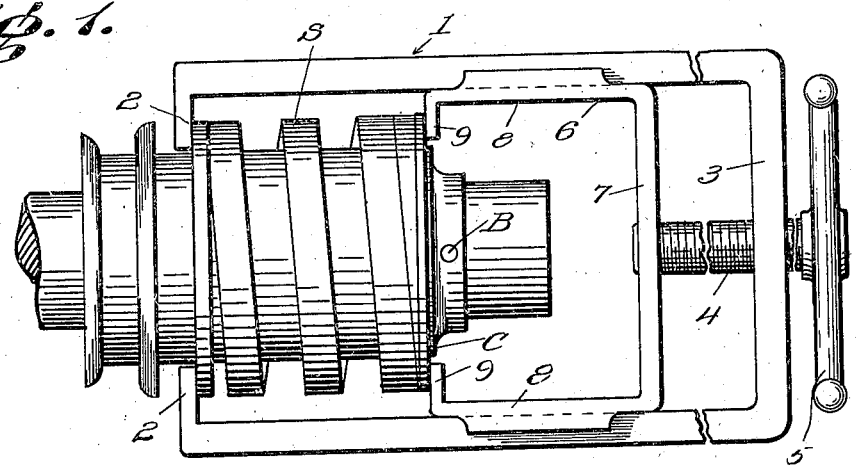
Figure 1 represents a side elevation of a compressor constructed in accordance with this invention shown applied, parts being broken out for convenience in illustration.

In the embodiment illustrated, the compressor constituting this invention comprises a yoke 1 of sufficient width to straddle the spring in connection with which it is used, the open end of the yoke having inturned fingers 2 to engage one end of the coiled spring S to be compressed, as shown in Fig. 1.

The cross bar or crown 3 of the yoke 1 has a threaded aperture to receive a jack-screw 4 which is provided at its outer end with a hand grip 5 and at its inner end has swivelled connection with the cross bar or crown 7 of an inner or sliding yoke 6, the arms 8 of which are grooved and flanged on their outer faces to receive the arms of the yoke 1 which form tracks or guides for the sliding inner yoke 6 as is shown clearly in Fig. 1. This yoke 6 is provided at its open end with inturned fingers 9 designed to engage the end of the spring S opposed to that which is engaged by the fingers 2 of yoke 1 so that when the jack-screw 4 is turned in one direction, the yoke 6 will move outward and compress between the fingers 9 thereof and the fingers 2 of yoke 1, the coiled spring S which will be held in compressed position until the screw 4 is reversed.

Figure 2:
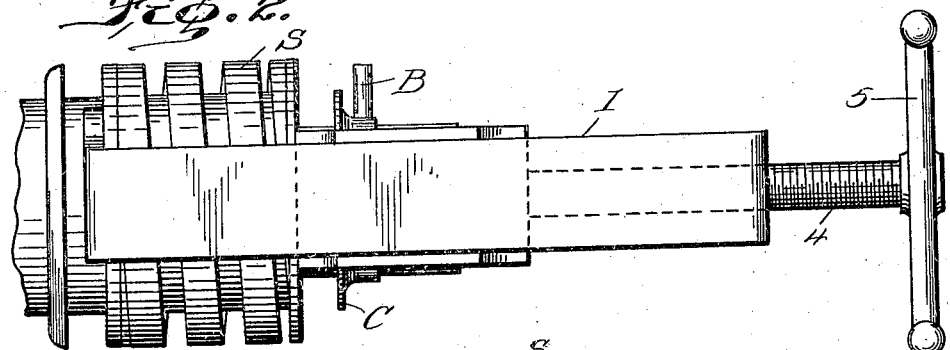
Fig. 2 is an edge view thereof taken in a plane at right angles to that shown in Fig. 1, and, Fig. 3 is a transverse section thereof.
Figure 3:
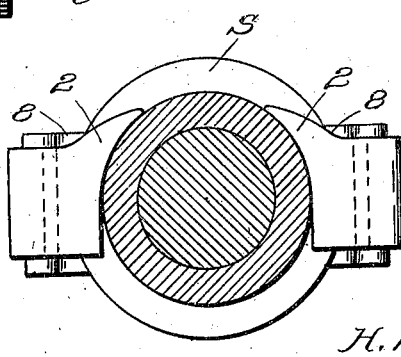

The compressor is shown applied to the transmission clutch spring of a Ford car, and in Fig. 2, the spring is shown so compressed as to permit the removal of the key bolt B from the shaft which permits the removal of the collar C and provides for the removal or replacement of the spring S.

It will thus be seen that the compressor constituting this invention is composed of three parts only, the inner yoke 6, outer yoke 1, and the jack-screw 4, which are formed of heavy metal sufficient to resist the strains to which the tool will be subjected and it may be readily carried in a tool box and ready for emergency as well as other uses.

As shown, the two yokes 1 and 2 are substantially U-shaped in form with their crowns or cross bars 3 and 7, respectively, facing toward each other and their open finger carrying ends facing each other so that when the device is applied for compressing a spring shown at S, the fingers 2 and 9 will engage the opposite ends of the spring as shown in Fig. 1, and the movement of the yoke 6 outwardly will forcibly compress said spring and the jack-screw 4 will hold it in compressed condition until the screw is turned in the opposite direction to release it.

The flanged arms or side members 8 of the inner yoke 6, straddle the arms of the yoke 1, and guide the yoke 6 in its sliding movement on yoke 1 and prevent all possibility of said yoke moving laterally relatively to the yoke 1.

The preferred embodiment of the invention is disclosed in the drawings and set forth in the specification, but it will be understood that any modifications within the scope of the claimed invention may be made in the construction without departing from the principle of the invention or sacrificing any of its advantages.

I claim:—

1. A spring compressor for installing a clutch spring in the clutch assembly of a Ford automobile, comprising two nested and oppositely slidable yokes with respective terminal spring-engaging fingers at opposite ends, with means for compressing the spring from the opposite ends, one yoke being slidable in the other yoke.

2. A spring compressor comprising two substantially U-shaped yokes one slidable longitudinally on the other with their open ends facing in the same direction, the arms of said yokes having inturned spring engaging fingers, and a jack-screw threaded through the cross bar of the outer yoke and having swivelled connection with the cross bar of the inner yoke whereby the turning of said screw will move the inner yoke inward or outward to compress or release a spring.

3. A spring compressor comprising two substantially U-shaped yokes one slidable on the other the arms of each being provided at their free ends with inturned spring engaging fingers, the inner yoke being longitudinally grooved or flanged to straddle and slidably engage the arms of the other, a jack-screw threaded through the cross bar of the outer yoke and having swivelled connection with the cross bar of the inner yoke whereby the turning of the screw will move the inner yoke inward or outward for compressing or releasing a spring.

In testimony whereof, I affix my signature hereto.

HAROLD FABER.